Figure 1:
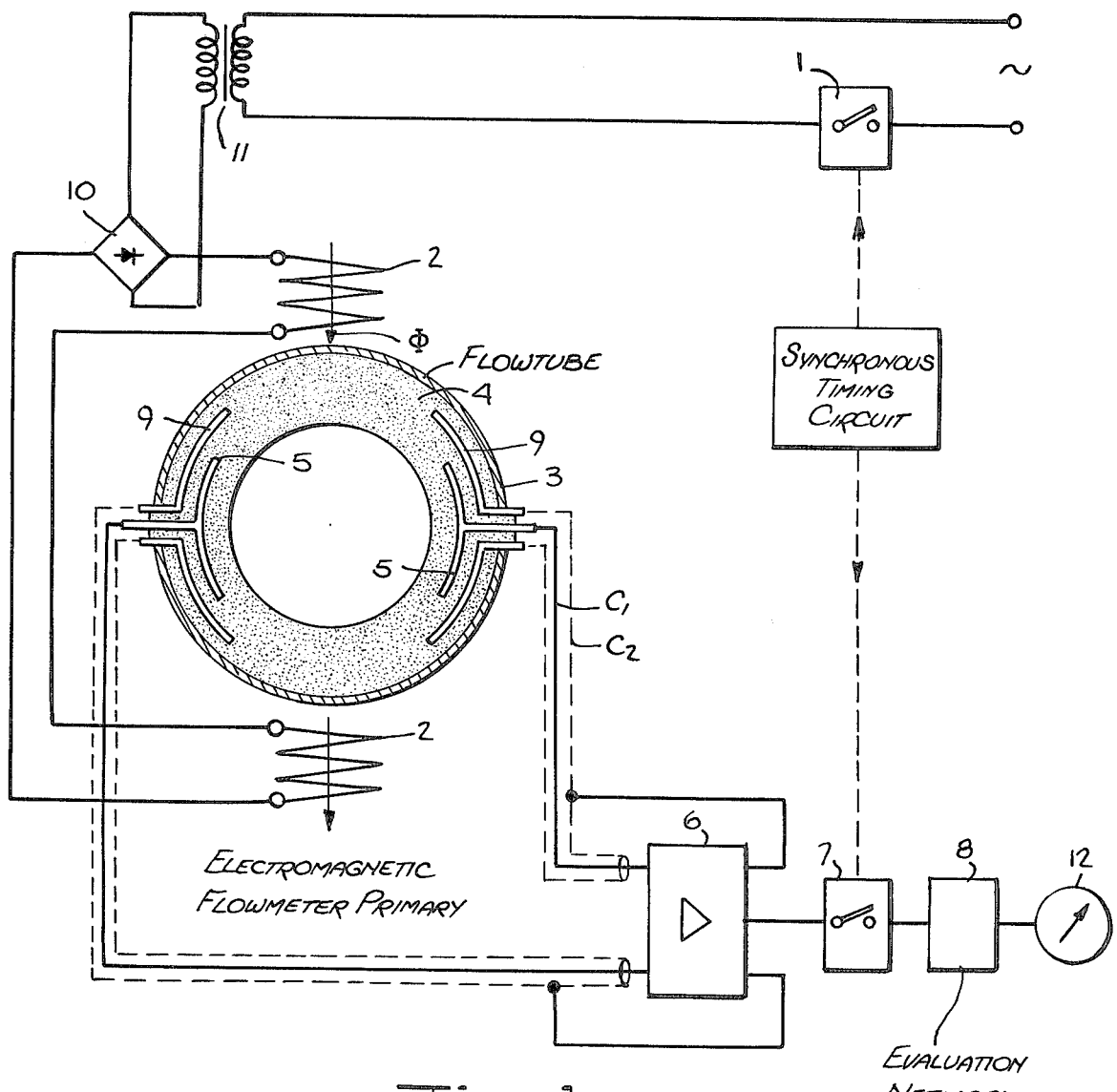

United States Patent [19]
Appel et al.

[11] 3,999,443
[45] Dec. 28, 1976

[54] ELECTROMAGNETIC FLOWMETER WITH SHIELDED ELECTRODES

[75] Inventors: Eggert Appel, Dransfeld; Gottfried Geisler, Gottingen; Wilfried Kiene, Hedemunden; Albert Seebode, Rosdorf, all of Germany

[73] Assignee: Fischer & Porter Co., Warminster, Pa.

[22] Filed: Sept. 29, 1975

[21] Appl. No.: 617,982

[30] Foreign Application Priority Data
Nov. 16, 1974 Germany .......................... 2454469

[52] U.S. Cl. .......................................... 73/194 EM
[51] Int. Cl.² .......................................... G01F 1/58
[58] Field of Search .............................. 73/194 EM

[56] References Cited
UNITED STATES PATENTS

| | | | |
|---|---|---|---|
| 2,733,604 | 2/1956 | Coulter | 73/194 EM |
| 3,759,097 | 9/1973 | Cushing | 73/194 EM |
| 3,783,687 | 1/1974 | Mannherz et al. | 73/194 EM |

Primary Examiner—Charles A. Ruehl

[57] ABSTRACT

An electromagnetic flowmeter system capable of measuring fluids having any degree of conductivity, including fluids having dielectric properties. The fluid to be measured is conducted through a dielectrically-lined flow tube to intersect a transverse magnetic field produced by an electromagnet, thereby inducing a voltage in a pair of planar electrodes mounted within the dielectric lining, each electrode being provided with a driven shield. The electromagnet is excited by a direct voltage which is periodically interrupted to produce a periodic steady state field whereby unwanted in-phase and quadrature components are minimized.

5 Claims, 2 Drawing Figures

ELECTROMAGNETIC FLOWMETER WITH SHIELDED ELECTRODES

BACKGROUND OF INVENTION

This invention relates generally to electromagnetic flowmeter systems, and in particular to a system in which the electromagnet is energized by a low-frequency, square-wave power.

In an electromagnetic flowmeter, the liquid whose flow rate is to be measured is conducted through a flow tube provided with a pair of diametrically-opposed electrodes, a magnetic field normal to the direction of flow being established by an electromagnet. When the flowing liquid intersects this field, a signal is induced therein which is transferred to the electrodes. This signal, which is proportional to the average velocity of the liquid and hence to its average volumetric rate, is then amplified and processed to actuate a recorder or indicator.

The magnetic field may be either direct or alternating, for in either event the amplitude of signal induced in the liquid passing through the field will be a function of its flow rate. However, when operating with direct magnetic flux, the d-c signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Though a-c operation is clearly advantageous in that polarization is obviated and the flow-induced a-c signal may be more easily amplified, it has distinct drawbacks. The use of an alternating flux introduces spurious voltages that are unrelated to flow rate and, if untreated, give rise to inaccurate indications. The two spurious voltages that are most troublesome are:

1. stray capacitance-coupled voltages from the coil of the electromagnet to the electrodes, and
2. induced loop voltages in the input leads. The electrodes and leads in combination with the liquid extending therebetween constitute a loop in which is induced a voltage from the changing flux of the magnetic coil.

The spurious voltages from the first source may be minimized by electrostatic shielding and by low-frequency excitation of the magnet to cause the impedance of the stray coupling capacitance to be large. But the spurious voltage from the second source is much more difficult to suppress.

The spurious voltage resulting from the flux coupling into the signal leads is usually referred to as the quadrature voltage, for it is assumed to be 90° out of phase with the a-c flow-induced voltage. Actual tests have indicated that this is not true in that a component exists in-phase with the flow-induced voltage. Hence, that portion of the "quadrature voltage" that is in-phase with the flow-induced voltage signal constitutes an undesirable signal that cannot readily be distinguished from the flow-induced signal, thereby producing a changing zero shift effect.

The calibration of existing types of a-c operated electromagnetic flowmeters is subject to variation as a function of temperature, fluid conductivity, pressure and other effects which can alter the spurious voltages both with respect to phase and magnitude. Hence, it becomes necessary periodically to manually re-zero the meter to correct for the effects on zero by the above-described phenomena.

All of the adverse effects encountered in a-c operation of electromagnetic flowmeters can be attributed to the rate of change of the flux field $(d\phi)/dt$, serving to induce unwanted signals in the pick-up loop. If, therefore, the rate of change of the flux field could be reduced to zero value, then the magnitude of quadrature and of its in-phase component would become non-existent and zero drift effects would disappear. When the magnetic flux field is a steady state field, as, for example, with continuous d-c operation, the ideal condition $d\phi/dt=0$ is satisfied. But d-c operation to create a steady state field is not acceptable, for galvanic potentials are produced and polarization is encountered.

The concern of the present invention is with a flowmeter of the type disclosed, for example, in German patent publication DT-AS 1,963,901, wherein a flow tube lined with dielectric material is provided with two or more planar electrodes which have a relatively large area, the electrodes being in electrically-conductive contact with the liquid passing through the tube. In flowmeters of this type, the usual practice is to employ a sinusoidal alternating field, as a consequence of which special compensation means are necessary to eliminate interference and, in particular, the interfering quadrature voltage.

These interfering quadrature voltages are applied to and act to overdrive the amplifying means connected in series with the measuring electrodes. Non-conductive coatings formed on the measuring electrodes and partially or fully covering these electrodes serve to change the valence field of the signal detection, especially in the case of large-area measuring electrodes. As a consequence, in addition to the interfering quadrature voltages, zero drift and other errors in the measuring voltage are encountered. To avoid these interfering effects, it is necessary to keep the surfaces of the measuring electrodes clean. For this purpose, use is made of cleaning devices which function electrically or mechanically.

Over and above the expenditures involved in employing these cleaning devices, a further disadvantage arises by reason of the fact that the mechanical elements of the cleaning devices act in combination with the measuring electrode leads to increase the stray capacitance of the signal lead out. As a secondary consequence of this arrangement, the useful range of the flowmeter is restricted with respect to the permissible lower limit of the electrical conductivity of the fluid being measured.

While such interfering quadrature voltages can be eliminated by exciting the flowmeter with square-shaped a-c fields, or by periodic d-c fields, as disclosed in U.S. Pat. Nos. 3,550,446; 3,329,018 and 3,786,687, or in German patent publication 2,052,175, asymmetric electrochemical voltages are generated in these arrangements as well as external direct voltages. These voltages must be rendered ineffective in order to prevent overdrive of the amplifying means coupled to the measuring electrodes.

In the presence of flowing liquid having abrasive properties, the measuring electrodes which are in direct conductive contact with these liquids must be fabricated of a material resistant to abrasion, for otherwise abrasion may in time result in the destruction of the electrodes. Moreover, corrosion and crystallization taking place in the slits of the insulation elements for the electrodes extending through the flow tube act to impair the effectiveness and life of the flow tube.

German Pat. No. 1,473,041 and U.S. Pat. No. 3,274,831 disclose a flowmeter energized by a sinusoidal high-frequency a-c field, the flowmeter having two or more planar electrodes of large area and a shield of even larger area cooperating with each electrode. This shielded-electrode flowmeter arrangement is usable to measure both non-conductive as well as conductive fluids, so that it may be employed to measure dielectric fluids.

For measuring dielectric fluids, the electrodes are covered by the dielectric lining of the flow tube and are thereby protected from the fluid. This lining, together with the dielectric of the fluid, constitutes the dielectric of a capacitor whose plates are formed by the planar measuring electrodes. In flowmeters of this type, stray capacitive effects may lead to erroneous measurements.

SUMMARY OF INVENTION

In view of the foregoing, it is an object of this invention to provide an electromagnetic flowmeter system of simple design which requires little maintenance and obviates the need for electrode cleaning devices.

More specifically, it is an object of this invention to provide a flowmeter system having shielded planar electrodes, the meter being excited by a periodic d-c voltage producing a steady state flux field whereby unwanted in-phase and quadrature components are minimized.

Because a meter in accordance with the invention is free of zero-drift effects and of asymmetric electrochemical voltages, the meter is highly accurate and reliable. A significant feature of the improved meter is that it is capable of measuring the flow rate of liquids having virtually any degree of conductivity, including liquids that are dielectric in character.

Briefly stated, these objects are attained in a flowmeter system in which the flow tube is provided with a dielectric liner having at least two planar electrodes embedded therein, the electromagnetic coils of the meter being energized by a direct voltage which is applied thereto by a power supply including a first switch which is periodically actuated at a low-frequency rate whereby each cycle of the resultant magnetic field includes a steady state interval in which $d\phi/dt=0$.

The electrodes are connected to the high-impedance input of an amplifier whose output is coupled to an indicating device through a second switch whose operation is synchronized with the first switch, whereby the indicating device is only responsive to the signal produced during the steady state intervals.

OUTLINE OF DRAWINGS

Figure 2:
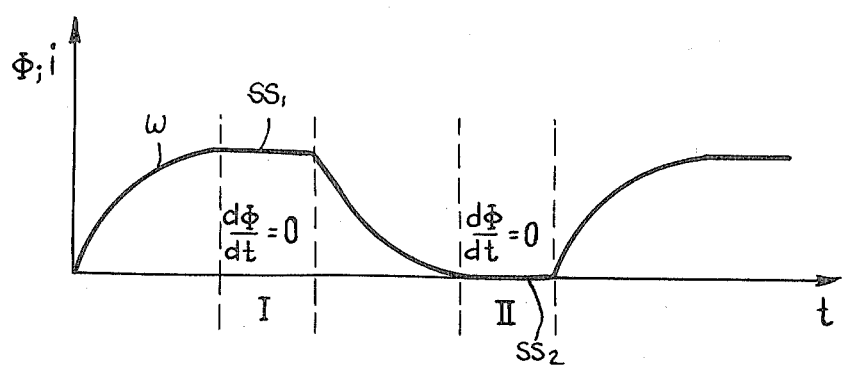

For a better understanding of the invention as well as other objects and further features thereof, reference is made to the following detailed description to be read in conjunction with the accompanying drawings, wherein:

FIG. 1 schematically illustrates an electromagnetic flowmeter system in accordance with the invention; and FIG. 2 is a wave form of the electromagnetic field intensity produced in the system as a function of time.

DESCRIPTION OF INVENTION

Referring now to FIG. 1, there is shown a flowmeter system in accordance with the invention constituted by a primary in the form of an electromagnetic flowmeter adapted to produce a low-level output signal whose amplitude is proportional to the flow rate of the liquid being measured, and a secondary which converts this low-level signal to an output signal in a usable current range, such as 0 to 20 mAmps.

The flowmeter primary includes a metal flow tube 3 through which a fluid to be measured is conducted, which fluid may have a very low conductivity. An electromagnet having serially-connected coils 2 disposed on opposite sides of tube 3 acts to establish a magnetic field transverse to the direction of flow and parallel to the longitudinal axis of the flow tube. The interior of flow tube 3 is provided with a cylindrical lining 4 of dielectric material.

Embedded in lining 4 at diametrically-opposed positions therein are a pair of planar measuring electrodes 5 of relatively large area, which electrodes are curved to conform to the curvature of the tube. These electrodes are electrically insulated from the liquid flowing through the tube. Also embedded in the lining 4 and coaxially disposed with respect to the measuring electrodes are planar shields 9. The area of the shields is greater than the area of the electrodes shielded thereby.

As is well known, a signal is induced in the liquid whose flow intersects the magnetic field, the signal being transferred to electrodes 5 to produce a primary output signal that reflects the flow rate. This primary signal is referred to as the flow-induced signal to distinguish it from spurious signal components that are independent of flow rate.

The output signal from the primary of the flowmeter system is applied to a secondary, including an amplifier 6 having a high-impedance input connected through the inner conductors $C_1$ of a pair of coaxial cables to measuring electrodes 5. The outer conductors $C_2$ of the cables which shield the inner conductors thereof serve to connect the output of amplifier 6 to the electrode shields 9, whereby the output of the amplifier is fed back to the electrode shields. The input impedance of amplifier 6 preferably has a value of $10^{14}$ ohms.

The output of amplifier 6 is fed through a switching device 7 to the input of an evaluation network 8, the output of which is fed to a measuring or indicating device 12. The output of network 8 is preferably in a current range of from 0 to 20 mAmps.

The serially-connected electromagnetic coils 2 are connected through a rectifier 10 to the secondary winding of a transformer 10 whose primary winding is connected through a switching device 1 to an a-c power line, such as a line supplying power at 50 or 60 cycles. Switching devices 1 and 7 are synchronized by a suitable timing circuit so that both switches are periodically and simultaneously turned on and off at a relatively low rate, i.e., 3 Hz.

Thus, as shown in FIG. 2, the application of a rectified a-c to coils 2, which is periodically switched on and off by switch 1, produces a magnetic field $\phi$ having a wave form W. During the steady state intervals $SS_1$ and $SS_2$ of each operating cycle, switching devices 1 and 7 act respectively to apply power to the field coils 2 and to connect the output of amplifier 6 to evaluation device 8. Since $d\phi/dt=0$ during these intervals because of the steady state condition of the magnetic field in the flowmeter, the output of the meter represents only the flow-induced signal and is free of zero drift and all spurious components in the signal.

While there has been shown and described a preferred embodiment of an electromagnetic flowmeter with shielded electrodes in accordance with the invention, it will be appreciated that many changes and modifications may be made therein without, however, departing from the essential spirit thereof.

We claim:

1. An electromagnetic flowmeter system capable of measuring the flow rate of liquids having a low degree of conductivity comprising:
   A. an electromagnetic flowmeter primary including a flow tube provided with a liner of dielectric material, at least two planar measuring electrodes having a relatively large area embedded in said liner and insulated from liquid flowing through said tube, said liner and said electrodes constituting the dielectric and the plates of a capacitor, and an electromagnet having coils producing a transverse magnetic field in said tube which is intersected by said flowing liquid to induce a signal in said electrodes;
   B. a direct-voltage source;
   C. means including a first switch which is periodically actuated at a low-frequency rate to apply a direct voltage from said source intermittently to said coils whereby each cycle of the resultant magnetic field includes a steady state interval, said direct voltage source including a transformer whose primary is connected to an a-c power line through said first switch and whose secondary is connected to said coils through a rectifier, whereby the d-c voltage applied to said coils is interrupted periodically by said first switch;
   D. an amplifier having a high-impedance input connected to said electrodes to amplify the induced signal;
   E. means coupling the output of said amplifier through a second switch to an indicating device; and
   F. timing means synchronizing the operation of said second switch with said first switch, whereby said indicating device is only responsive to the signal produced during said steady state intervals whereby the effects of unwanted in-phase and quadrature components in said induced signal are substantially eliminated.

2. A system as set forth in claim 1, wherein each of said electrodes has a planar shield associated therewith whose area is larger than that of the electrode.

3. A system as set forth in claim 2, wherein said shield is coupled to the output of said amplifier and is driven thereby.

4. A system as set forth in claim 3, further including a pair of coaxial cables whose inner conductors connect said electrodes to the input of said amplifier and whose outer conductors connect said shields to the output of said amplifier.

5. A system as set forth in claim 4, wherein said electrodes and the shields associated therewith are curved to conform to the curvature of the flow tube and are coaxially disposed.

* * * * *